(No Model.) 4 Sheets—Sheet 4.
H. GROUVEN.
PROCESS OF AND APPARATUS FOR MAKING AMMONIUM SULPHATE.
No. 247,046. Patented Sept. 13, 1881.
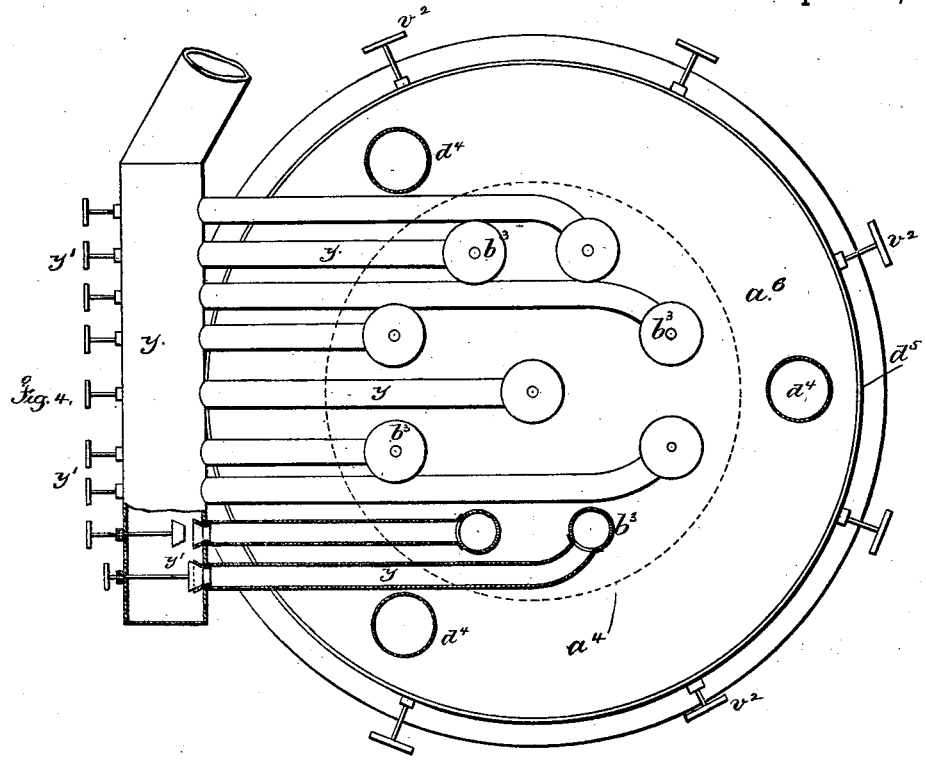
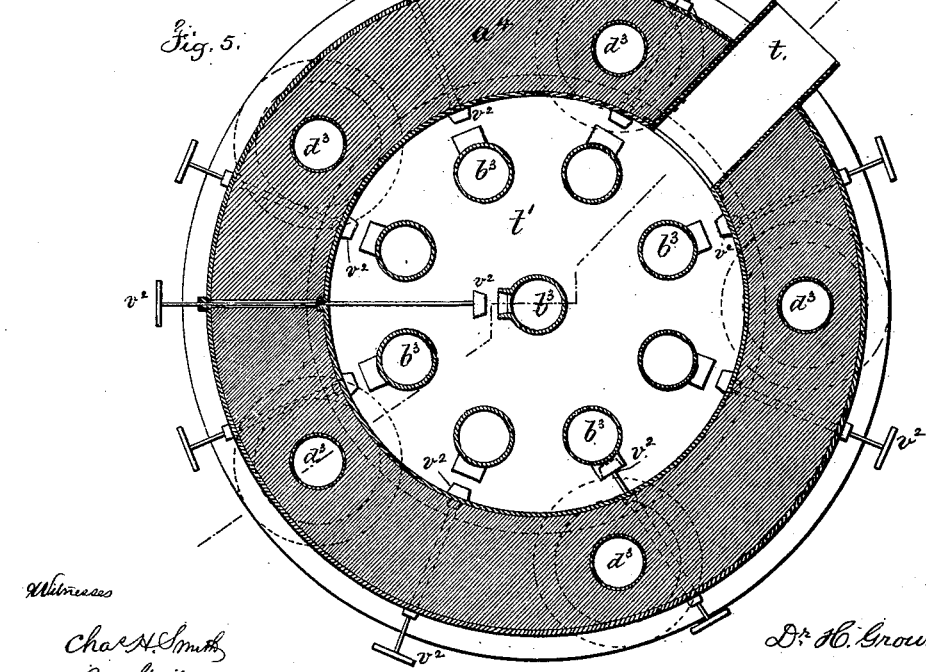

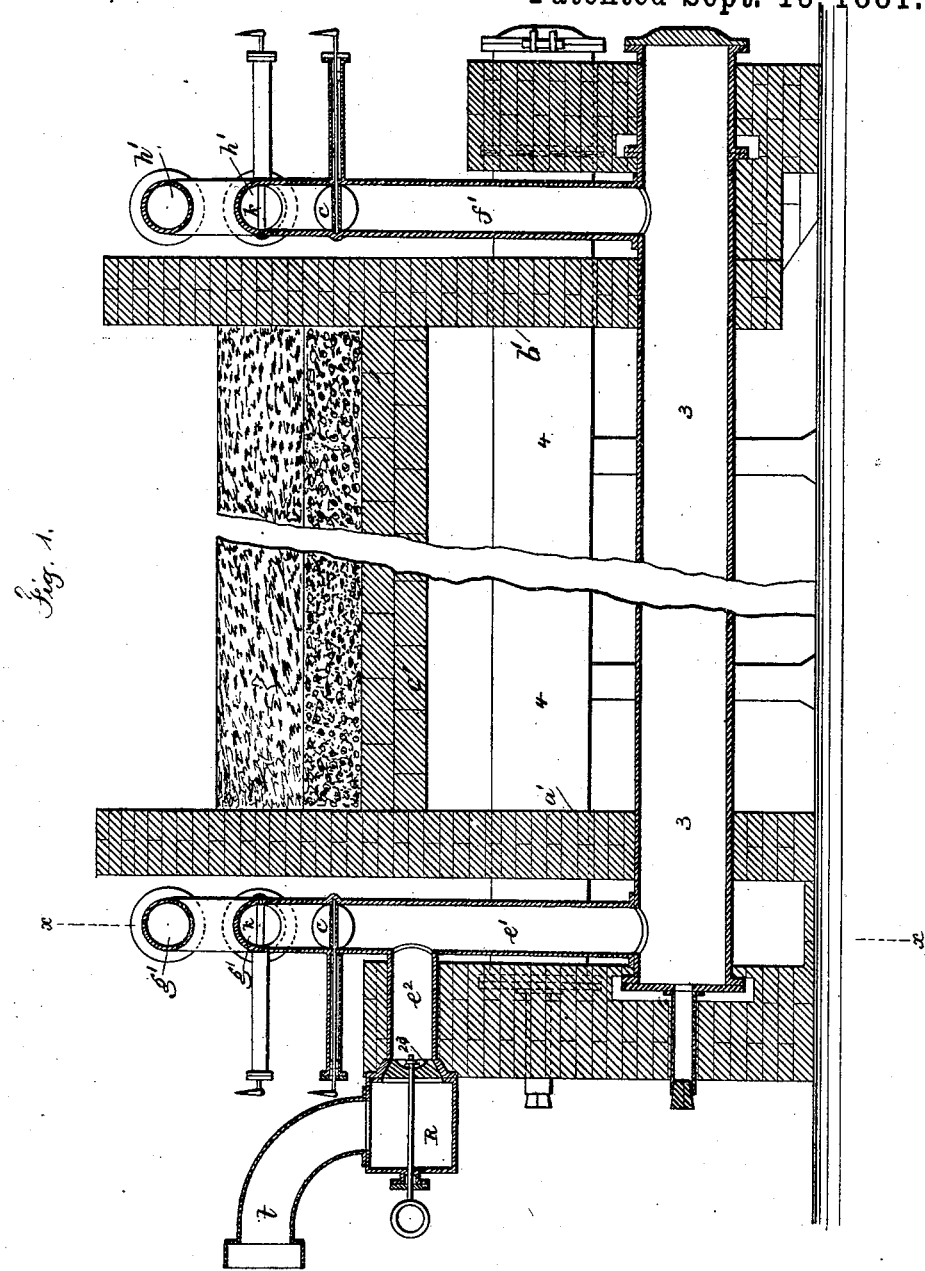

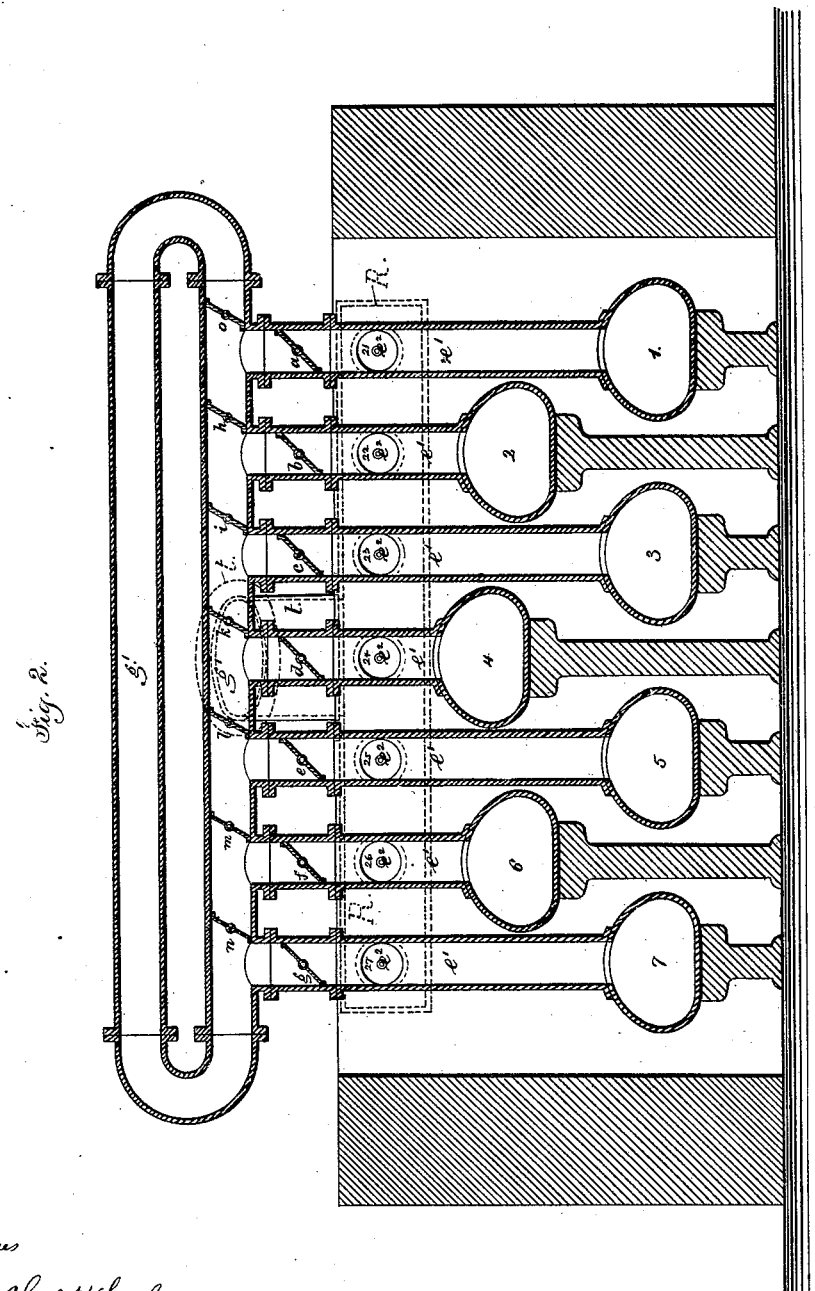

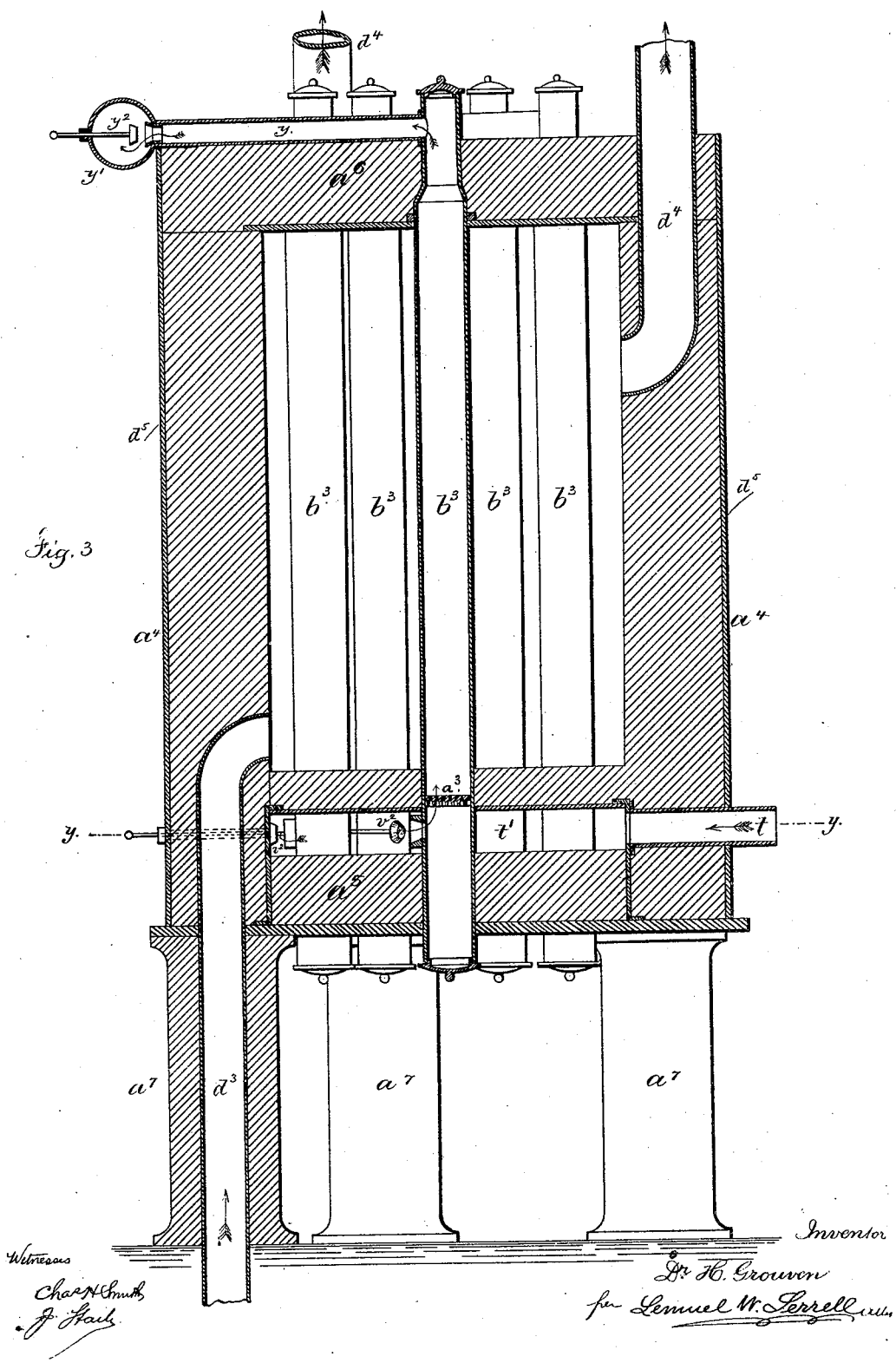

UNITED STATES PATENT OFFICE.

HUBERT GROUVEN, OF LEIPSIC, SAXONY, GERMANY.

PROCESS OF AND APPARATUS FOR MAKING AMMONIUM SULPHATE.

SPECIFICATION forming part of Letters Patent No. 247,046, dated September 13, 1881.

Application filed June 6, 1881. (No model.)

*To all whom it may concern:*

Be it known that I, Dr. HUBERT GROUVEN, of Leipsic, Saxony, German Empire, have invented an Improvement in the Manufacture of Sulphate of Ammonia, of which the following is a specification.

In Letters Patent No. 216,323, granted to me June 10, 1879, apparatus is shown and described for producing sulphate of ammonia from the nitrogen contained in the turf of marshy or meadow land, and a reference is hereby made to said patent for a more full description of matters only incidentally mentioned herein, my present invention relating more especially to the construction of the incinerating and ammonium furnace.

In the formation of ammonia from the organic nitrogen of turf by my process the whole of the organic drying substance is burned by means of steam of from 400° to 700° centigrade, so that nothing remains but the pure carbonic turf-ash. This combustion is effected in highly-heated retorts, from which atmospheric air is entirely excluded, and all organic nitrogen, as I have found by lengthy experiments, passes over, about sixty per cent. as carbonate of ammonia and about forty per cent. in the form of alkaline nitrogenous vapors, which, upon condensation, form tar; but, as I have also found by lengthy experiments, no nitrogen escapes in the form of valueless nitrogen gas, which is of considerable importance. This necessary and complete reduction of the turf into ash is effected by the incinerating-furnace.

For converting the nitrogenous vapors into carbonate of ammonia I employ what is called the "ammonium-furnace" in said Patent No. 216,323. By the use of this latter furnace not only are the whole nitrogenous contents of the turf obtained in the form of carbonate of ammonia, but a gaseous product is also obtained which is free from all organic vapors and carburets of hydrogen, and consists only of carbonate of ammonia, hydrogen, carbonic acid, and carbonic oxide, all in regular defined quantities. Condensed with the surplus steam that is contained therein, these gases give a clear colorless liquid product, which is so pure that without anything further it may be treated with sulphuric acid and evaporated, and this yields a sulphate of ammonia containing twenty-one per cent. of nitrogen—therefore almost chemically pure. To obtain this original result by the ammonium-furnace the following conditions are necessary: First, a temperature of the vapors and gases must be maintained between the melting-points of my pyrometer Nos. 1 and 2, referred to in my said patent; second, a large excess of highly-heated steam; third, the accompanying action of a peculiar contact substance of particular composition and equally particular physical condition during an interval of at least thirteen seconds for each volume of gas evolved; fourth, complete exclusion from atmospheric air; fifth, exclusion of all substances such as oxide of iron, gypsum, &c., which are reducible in the high heat by organic matters; sixth, exclusion of all chlorides, such as common salt, &c.

The steam necessary in these operations is given out by the turf itself, for the turf is introduced into the retorts in a moist state with a certain high percentage of water. By this means I save the expense of drying the peat, and also the expense of supplying steam from a separate boiler.

In the drawings, Figure 1 is a longitudinal section of the incinerating-furnace; and Fig. 2 is a cross-section of the same at the line $x\ x$, viewed in the direction of the arrow. Fig. 3 is a vertical section of ammonium-furnace. Fig. 4 is a plan of the same; and Fig. 5 is a sectional plan at the line $y\ y$, Fig. 3.

1, 2, 3, 4, 5, 6, and 7 are the retorts for receiving the turf. The size and number of the retorts may vary according to the capacity required of the furnace, and the retorts may be of iron or fire-clay. These retorts are supported horizontally within the space formed by the walls $a'\ b'$ and arch $c'$, and at the ends of said retort there are vertical pipes $e'$ at the back of the furnace, and similar pipes, $f'$, at the front of the furnace, and said pipes $e'$ and $f'$ open into the endless pipes $g'$ and $h'$, respectively.

In the pipes $e'$ and $g'$ there are valves or dampers $a, b, c, d, e, f, g, h, i, k, l, m, n$, and $o$, and in the pipes $f'$ and $h'$ there are similar valves or dampers. The pipes $e'$ are connected with the gas-chest R by pipes $e^2$ at the back of the furnace, and there are valves 21, 22, 23, 24, 25, 26, and 27 at the places where these pipes open into the gas-chest. By this arrangement of pipes and valves all the retorts are in connection with each other, and do not work separately, and the steam that quickly escapes from each freshly-charged highly-heated retort is obliged to pass through all the other highly-heated retorts before it leaves the furnace. The steam, in its course through the various retorts and pipes, with a relatively slow circulation, attains a constantly-increasing temperature, so that on its arrival at the fourth retort it has a temperature of 400° centigrade, at which the water is decomposed and combines with the peat or turf. This temperature keeps on rising in the fifth, sixth, and seventh retorts, and the quickness of the oxidation of the peat increases proportionately.

Each of the retorts may at any time be disconnected from the others simply by closing or opening certain valves, without the regularity of the circulation of the gases being disturbed. For instance, when the peat or turf contained in retort 1 has been deprived of its gas, and it is desired to remove the ash therein and recharge it with fresh turf, then the valves closed are $a\ h\ k\ m\ o$ at the front of the furnace and $a\ b\ g\ h\ i\ l\ n$ at the back of the furnace, all the others being open. At the same time the valve 22 of the gas-chest R is opened. This operation of opening and closing the valves requires but a few seconds of time, and when completed retort 1 is completely isolated. The back and front doors of said retort may then be opened without any trace of gas coming from the two vertical pipes $e'$ and $f'$, notwithstanding the pressure of gas that there is in the other retorts. Suppose retort 5 is to be disconnected from the other retorts for the purpose of removing the ash and recharging, then the valves closed are $e\ i\ l\ m\ o$ at the front and $d, e, f, h, k, l, m,$ and $n$ at the back of the furnace—all the others open. At the same time valve 26 of the gas-chest R is opened, all the others being closed.

In order that the incinerating-furnace may work in the best manner, it is not only necessary that the retorts should be charged successively in the same order with the constant interval of time of a quarter of an hour, but also that the retort which has been longest charged, the peat or turf contents of which have therefore been completely reduced to ash, shall always receive the hottest steam, and that then from out of this retort the stream of the gases and vapors shall flow direct into the ammonium-furnace until they are discharged.

In the door at the rear of each retort there is a hole about twenty millimeters in diameter, through which passes a round iron bar long enough to reach to the front of the retort, and this rod is provided with a scraper, so that the bed of glowing peat on the floor of the retort may be stirred about four times in an hour without admission of air, which is indispensably necessary for the successful oxidation of the peat or turf.

The door at the front of each retort should be so constructed that by simply moving a lever one way or the other the door is quickly opened or shut. The door should close airtight.

The pyrometer described in my said Letters Patent may be used for indicating the heat of the retorts. For this purpose it is only necessary to mix the metallic particles Nos. 2 and 3 with charcoal-powder, and then fill with it an iron gas-pipe one hundred and fifty millimeters long and twenty millimeters in diameter, and, after luting both ends with clay, throw it into the bed of turf in the retort. After half an hour's interval No. 2 should be melted, but not No. 3.

If No. 2 should not be melted, then the heating of the gas in the furnace is weak, and must be strengthened; but if No. 3 is shown to have melted, then the heat is too great, and therefore the heating of the gas in the furnace is to be made less intense.

Although the heat in the fire-space of the furnace approximates the bright-red heat (copper melting) of the ordinary retort-furnaces for making illuminating-gas, it is, however, indispensable to regulate it in accordance with the temperature required in the interior of the retort, as above specified.

The heating apparatus of the incinerating-furnace should be of such kind that it again takes up and burns in its fire-space all gases produced in its retorts after such gases have passed through the ammonium-furnace and have left all their ammoniacal contents behind. The quantity of this gas is extraordinarily large. Each centner (hundred-weight) of peat or turf that is converted to ash in the retorts is equal to the liberation of nearly one centner of steam, and finally yields about one hundred and thirty cubic meters of gas of 20° centigrade and of the composition already stated. By this arrangement a quantity of heat is generated in the furnace that is nearly sufficient to liberate afresh a centner of steam in the retorts, free of expense, in the form of oxygen and hydrogen gas—that is to say, to convert another centner of peat or turf into gas and ash, as is hereinabove more particularly described; yet, as before stated, this source of heat does not suffice to provide the whole of the heat required in the manufacture. The evaporation of water in the incinerating-furnace, as also the loss of heat from diffusion, which is unavoidable upon every firing operation, demands an addition which, according to my experiments, amounts, on a large scale, to about half a centner (twenty-five kilograms) of coke to one centner (fifty kilograms) of peat or turf. I gasify this coke in a generator in connection with the incinerating-furnace, and conduct the carbonic-oxide gas thereby produced, united with the gas of the retorts, into the furnace for its combustion.

By means of my retort system pieces and fragments of any suitable size of leather, horn, hoofs, wool, hair, and all cheap animal refuse generally, in which the nitrogen frequently rises to fifteen per cent., may be gasified equally as well and quickly as the moist peat or turf. With the co-operation of my ammonium-furnace their organic nitrogen goes over, also without loss, in the form of carbonate of ammonia. The hot vapors and gases from the incinerating-furnace pass by the pipe $t$ to the ammonium-furnace next described, which is shown in Fig. 3 by a vertical section, by a plan view in Fig. 4, and by a sectional plan in Fig. 5.

The furnace proper is composed of the vertical walls $a^4$, bottom $a^5$, and top $a^6$, the whole supported by the columns $a^7$.

$b^3$ are the vertical retorts for receiving the porous filling or contact mass. I have shown nine of these retorts, and they are preferably arranged as represented in Fig. 5. The upper end of each retort projects above the top $a^6$, and is provided with a cover to give access for filling, and the lower end of each retort is below the bottom $a^5$, and is provided with a cover to allow the retort to be emptied. These covers at the top and bottom of the retorts should close air-tight. There is a grate at $a^3$ in each retort, which supports the contact mass, and this grate is fitted to turn for easily discharging the contents of the retort. There is a gas-chest formed at $t'$ within the bottom $a^5$, and each retort communicates with this chest by a short tube at the side of the retort, that is made with a valve-seat for the valve $v^2$. These valves are kept open, so that the vapors and gases from the incinerating-furnace can pass from the gas-collecting chest $t'$ into the retorts $b^3$.

Each retort is provided with a discharge-pipe, $y$, that opens into the trunk $y'$, and in each pipe there is a valve, $y^2$. When it is desired to isolate one of the retorts for regenerating the contact mass by means of a current of air or steam, or for discharging the spent contact mass and supplying fresh material, then the valves $v^2$ and $y^2$ of that retort are closed. This isolates it from all the others and does not interfere with their working. This recharging of the retorts is absolutely necessary after the contact mass has been in use several days and the retorts should be recharged in regular order.

The heat necessary for this ammonium-furnace must, of course, be greater than that within the retorts. It should be somewhat under the melting-point of yellow brass. The pyrometer before referred to may be used for determining the heat of the furnace. The heated gases that are burned within the furnace are brought in by the pipes $d^3$, that are represented as within the columns $a^7$, and the products of combustion escape by the pipes $d^4$. There is a metal casing at $d^5$ to the walls of the furnace, and said walls may be made double, with an air-space between to prevent loss of heat. The trunk $y'$ is connected to an exhaust apparatus, and the pipes $y$ should each be provided with a manometer to indicate the amount of gases passing from the retorts to the condenser. If abnormally too much or too little gas is passing through a retort, it results from such retort being provided with a too light or too dense contact substance, as the case may be. This is corrected by adjusting the inlet-valves $v^2$.

Instead of the retorts being filled with the contact substance more particularly referred to in my aforesaid patent, they may be filled with other neutral refractory materials which present a large surface to the gases passing through them—for example, pieces of burnt meadow-chalk, burnt gray lime, burnt claystone, pumice-stone, asbestus, meerschaum, &c. These substitutes fulfill quite imperfectly the important object of changing the tarry and nitrogenously rich vapors of the incinerating-furnace into carbonate of ammonia.

The composition and method of producing the contact substance mentioned in my said Letters Patent refer entirely to air-dried materials, which so far require to be supplemented, as by the employment of chalk, cement, clay, and bog in the moist state, which allows of a more intimate admixture and one more mechanically easy to carry out, thus being more suitable. I have found it more suitable in practice first to mix chalk and clay very intimately in a pug-mill, and then add the moist bog or peat. In other respects no change is made in the above-mentioned composition, always considered as a drying substance. The latter is only admissible within certain narrow limits, and then solely with reference to those chemical varieties which different kinds of clay, meadow-chalk, and cement-clay might present.

What I claim as my invention is—

1. A series of horizontal retorts, in combination with the ranges of vertical pipes $e'\ f'$, connecting-pipes $g'\ h'$, gas-chest R, pipes $e^2$, and valves, substantially as set forth, adapted to combine any desired number of retorts in a single circulating series.

2. The method herein specified of treating peat or bog containing water for the production of gas and the reduction of the material to ashes, consisting in introducing such peat or bog successively into retorts in a series and causing the vapors and gases to pass through the previously-charged retorts and be delivered from the retort containing the charge that has been longest under the action of heat, substantially as set forth.

3. The combination, in an apparatus for the conversion of moist peat or bog into gases, of a range of retorts, a vertical pipe near each end of each retort, and a valve in the same, connecting-pipes for the ranges of vertical pipes, and valves in said connecting-pipes between each two vertical pipes substantially as specified.

4. The method herein specified of treating animal refuse rich in nitrogen for conversion into carbonate of ammonia, consisting in heating the same in a retort and passing the gases through similar retorts in succession in the order in which they have been exposed to the action of fire for a longer time, substantially as set forth.

5. The combination, in the ammonium-furnace, of a series of vertical retorts, with lateral openings, with an inclosing-case having a chamber, $t'$, for the introduction of the gases, and the discharge-pipes and stoppers or valves, substantially as set forth.

6. A vertical range of retorts having inlet and discharge caps and lateral openings near the bottom, in combination with an inclosing-case for heat to act on the retorts, a gas-chamber, $t'$, connecting with the lateral openings into the retorts, valves to close the lateral openings, an escape-pipe from the top of each retort, a gas chest or pipe, $y'$, and valves $y^2$, substantially as set forth.

In testimony whereof I have hereunto set my hand, this 26th day of October, 1880, in the presence of two subscribing witnesses.

DR. HUBERT GROUVEN.

Witnesses:
BERTHOLD ROI,
BANCROFT C. DAVIS.